Sept. 26, 1961  E. P. AGHNIDES  3,001,601
VEHICLE WITH TILTABLE WHEELS
Filed Dec. 20, 1954  3 Sheets-Sheet 1
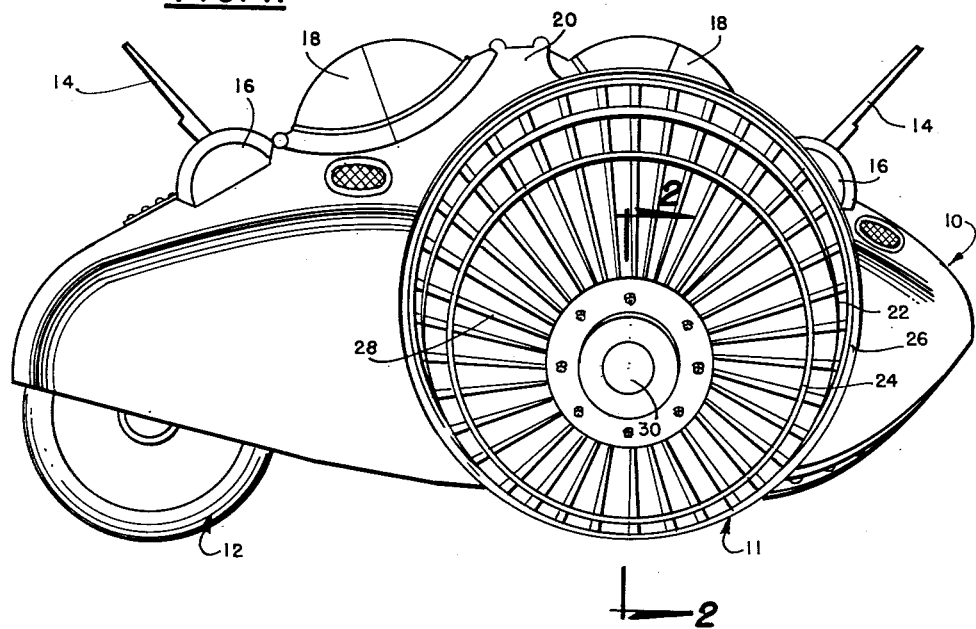
INVENTOR
ELIE P. AGHNIDES
BY Moore & Hall
ATTORNEYS Sept. 26, 1961     E. P. AGHNIDES     3,001,601
VEHICLE WITH TILTABLE WHEELS
Filed Dec. 20, 1954     3 Sheets-Sheet 2

INVENTOR
ELIE P. AGHNIDES
BY *Moore & Hall*
ATTORNEYS

Sept. 26, 1961    E. P. AGHNIDES    3,001,601
VEHICLE WITH TILTABLE WHEELS
Filed Dec. 20, 1954    3 Sheets-Sheet 3

INVENTOR
ELIE P. AGHNIDES
BY Moore & Hall
ATTORNEYS

United States Patent Office 3,001,601
Patented Sept. 26, 1961

3,001,601
VEHICLE WITH TILTABLE WHEELS
Elie P. Aghnides, 46 W. 54th St., New York, N.Y.
Filed Dec. 20, 1954, Ser. No. 476,239
7 Claims. (Cl. 180—75)

This application is a continuation-in-part of applicant's prior application, Serial No. 362,700, filed June 19, 1953 for "Vehicle With Inclined Hemispheroidal Wheels," now U.S. Patent No. 2,812,031, granted November 5, 1957.

A vehicle having hemispherical wheels is described and claimed in Patent No. 2,372,043, granted to me on March 20, 1945. Reference is made to this patent for a description of the primary advantages of a vehicle having generally hemispherical wheels and to the aforesaid application for a description of the primary advantages of a vehicle having conoidal wheels with their axes pointed downwardly and outwardly from the vehicle body.

The present application describes a wheel arrangement particularly adaptable to vehicles of the type previously described but the principles of which are applicable to other types of vehicles. The advantages inherent in a tilted conoidal wheel have already been adequately set forth, but the present application sets forth a wheel construction embodying adjustable tilt, among other features.

It is accordingly a primary object of the invention to provide a unique vehicle.

A further object of the invention is to provide a novel tiltable wheel construction.

A still further object of the invention is to lower or raise the body of a vehicle by tilting the wheels.

Yet another object of the invention is to provide a novel wheel construction embodying either a conoidal pneumatic tire or a tire of the known type.

An important object of the invention is to provide a novel steering principle.

A still further object of the invention is to provide a unique wheel construction incorporating means for propelling a vehicle through water.

These and other objects of the invention will become more apparent in the following detailed description of the invention taken in conjunction with the accompanying drawings wherein:

FIGURE 1 is a side elevation view illustrating the general appearance of a vehicle constructed generally in accordance with the principles set forth in the aforesaid prior patent and patent application and incorporating tiltable wheels in accordance with the present invention;

FIGURE 2 is a sectional view taken along line 2—2 in FIGURE 1 illustrating a tiltable wheel construction in accordance with the present invention, including unique means for propelling a vehicle through water, the tilting means being indicated in phantom;

Figure 5:
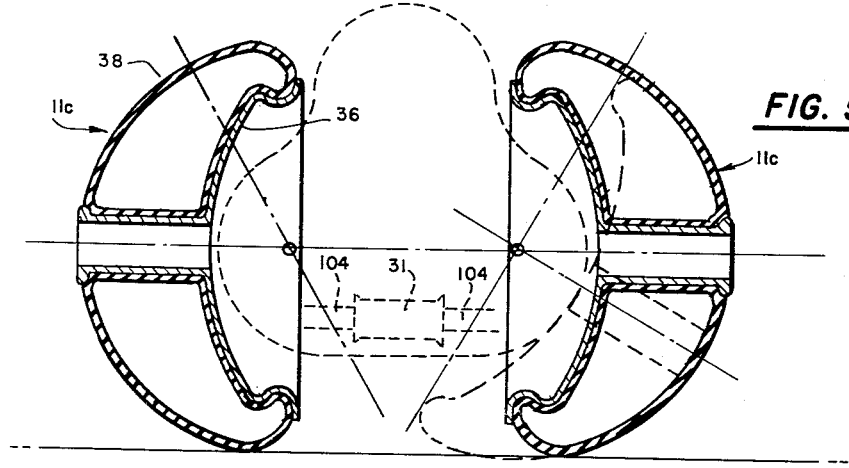
Figure 6:
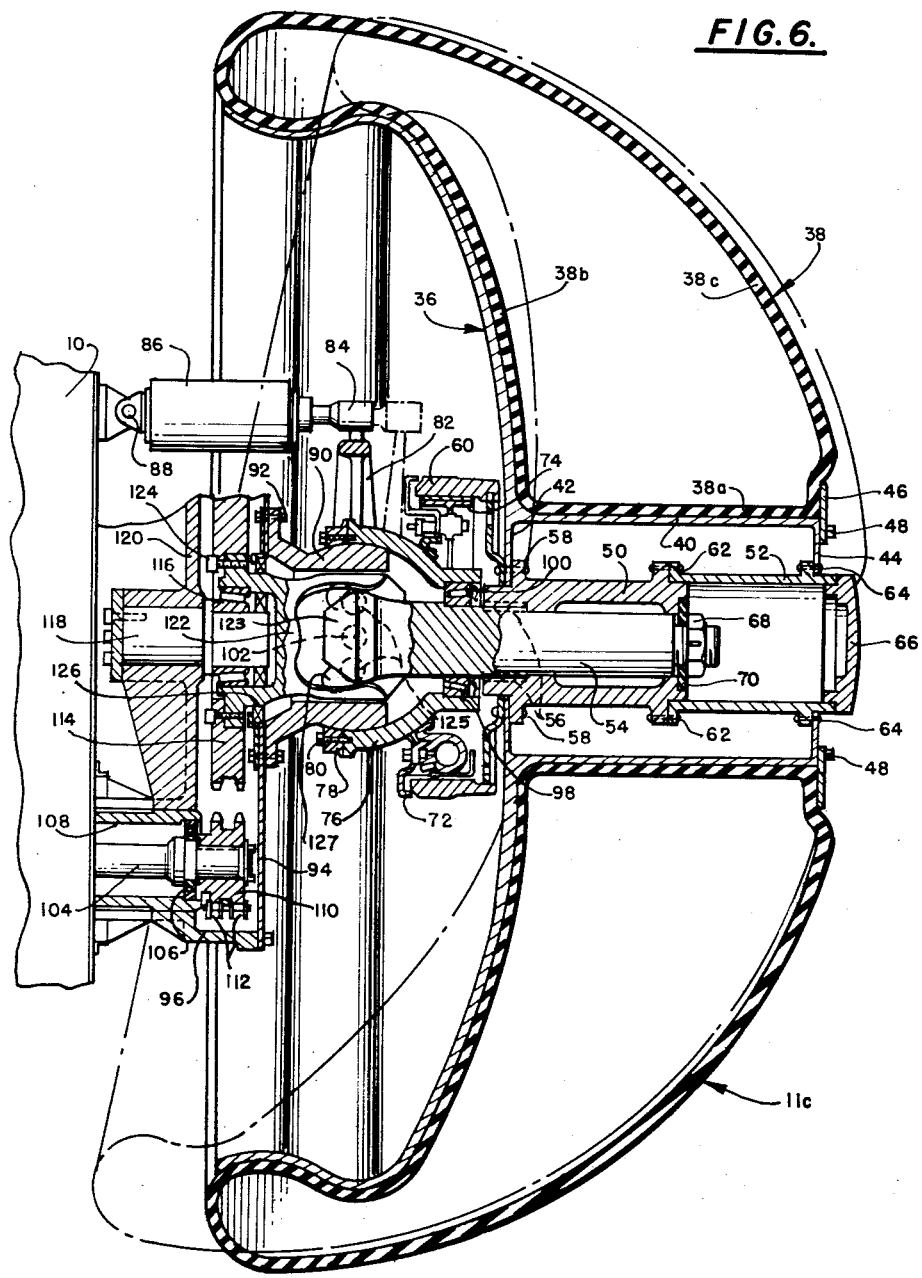

FIGURE 5 is a diagrammatic showing, partly in section and partly in phantom, of a vehicle provided with a pair of tiltable wheels each having a single pneumatic tire of unique design, this figure illustrating the tiltability of the wheels; and FIGURE 6 is an enlarged sectional view of a tiltable wheel of the type indicated in FIGURE 5 and illustrates the wheel construction as well as the means for tilting the wheel.

Figure 4:
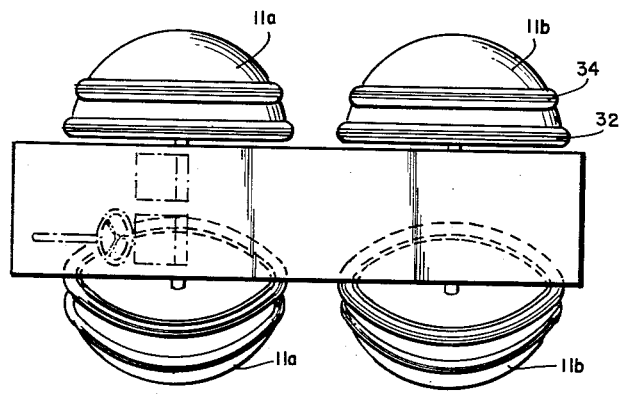
FIGURE 4 is a diagrammatic plan view of a vehicle provided with two pairs of tiltable wheels, each wheel supplied with a pair of pneumatic tires.

As set forth in applicant's aforesaid prior application, a vehicle having conoidal wheels may be amphibious and capable of operating over deep snow, soft mud or sand with equal facility. While the novel principles involved in the construction of such a vehicle are of general application, these principles have particular advantages as applied to an army vehicle for combat or transportation. Such vehicles are illustrated in FIGURES 1 and 4. In FIGURE 1, an enclosed body 10, having missile deflecting curved surfaces, is provided with a pair of forwardly mounted ground engaging propelling wheels 11, one on each side of the vehicle and having a major diameter substantially equal to the overall height of the vehicle body. The body may also be provided with a ground engaging rearwardly mounted motor driven and steering tail wheel 12, of smaller diameter than the propelling wheels 11. Body 10, or at least the lower portion thereof, preferably is of water tight construction to make the vehicle amphibious, as described in my prior application. The propelling wheels 11 are generally hemispheroidal in shape having their apexes facing outwardly and their rotational axes inclined downwardly and outwardly in opposite directions. As indicated in FIGURES 4 and 5, the wheel axes may also be made horizontal. When the rotational axes of the wheels are inclined, the wheels 11 present an increased area for engagement with soft terrain, while at the same time the center of mass of the wheels, and consequently that of the entire vehicle is lowered. Inclination of the wheel axes is particularly desirable when the vehicle is traveling over deep snow, soft mud, or sand, or even in general cross-country travel where added traction and stability are desirable. However, for high speed hard surface road travel a smaller area of terrain engagement by the wheels is desirable. In accordance with the principles of the present invention, the advantages attendant the tilted wheel construction of my prior application are maintained or in fact enhanced, while at the same time a vehicle constructed in accordance with these principles acquires the additional advantages inherent in an upright wheel configuration. When the vehicle is travelling over mud, sand, or snow with the wheels strongly tilted to offer a greater surface of contact and to lower the center of gravity of the vehicle, the wheels shield the lower side of the vehicle body. Practically the entire side of the vehicle facing the ground is transformed into a means of traction. On the highway, with the wheels tilted slightly or not at all, the vehicle may move as speedily as a conventional automobile.

Referring again particularly to FIGURE 1, a vehicle constructed in accordance with my invention may include armament comprising automatic weapons 14 supported in conventional drum or turret type mountings 16. Hingedly mounted transparent canopies 18 preferably are incorporated in the cabin roof 20 both to provide visibility and to serve as access hatches.

The propelling wheels 11 may be constructed generally in accordance with those disclosed in the aforementioned application and may have a water tight, cellular or compartmental construction to preserve buoyancy in case one compartment is damaged to the extent of causing leakage. A raised primary tread 22, preferably of rubber or other suitable material, encircles each wheel together with raised secondary treads 24, 26, which also engage the ground when the vehicle is operated over soft or marshy terrain. The hemispheroidal surface of each wheel 11 also is provided with tread-intersecting raised ribs or cleats 28, preferably of hard rubber, which radiate from the apex or hub 30 of the wheel. These ribs provide increased traction when the vehicle is operating over soft terrain and also serve as paddles to propel the vehicle when operated in water. As described in the aforesaid prior application, the vehicle may be steered by turning the tail wheel 12 or by braking the individual propelling wheels 11, which may be driven from a conventional differential 31 (see FIG. 5). A suitable engine may be provided to power the vehicle. Mechanical linkages for coupling the engine to the propelling wheels may assume the form described in detail hereinafter.

The hemispherical wheels illustrated in FIGURE 1 are merely exemplary of the type of wheels which may be employed. FIGURE 4 and FIGURES 5 and 6 illustrate other types of wheels which may be utilized.

Figure 3:
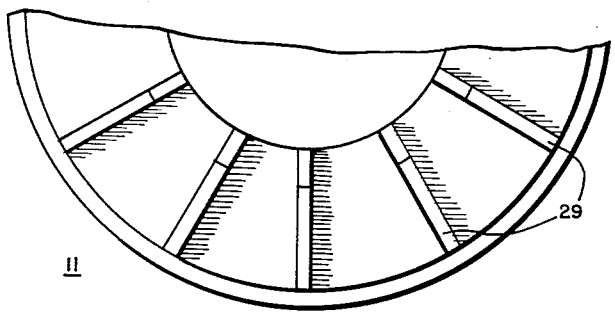
FIGURE 3 is a detail taken along line 3—3 in FIGURE 2 and further illustrating the unique propelling means of that figure.

In FIGURE 2 ribs 28 are supplemented by radial ribs 29 located on the inner surface of the propelling wheels. These ribs may be more clearly seen in FIGURE 3. In some instances it may be desirable to eliminate ribs 28 and to rely solely on ribs 29 for propulsion through water. The use of radial ribs on the inner surfaces of the propelling wheels is particularly advantageous in an adjustably tiltable wheel, but also may be employed in the fixed tilt wheel embodiment described in my aforesaid application. The tilting and drive mechanisms have been indicated by phantom lines in FIGURE 2, but before describing these mechanisms in detail, reference is made to FIGURES 4 and 5.

FIGURE 4 illustrates diagrammatically a vehicle having two pairs of adjustably tiltable wheels 11a and 11b which may assume the generally hemispherical form of FIGURE 1. The wheel of FIGURE 4, however, is provided with a pair of pneumatic tires 32, 34, which may be of generally conventional construction per se, mounted in complementary depressions in the outer surfaces of the wheels 11a and 11b; and, in vertical section, said wheels 11a—11b have a shape generally similar to those shown at FIGURE 4 of my prior Patent No. 2,812,031, identified previously. The wheels on one side are shown tilted and therefore have their rotational axes pointed downwardly. The wheels may be tilted individually, or certain wheels may be tilted in unison (as shown and discussed in reference to FIGURE 6 subsequently). A unique principle of vehicle steering may be realized by tilting the wheels on the respective sides of the vehicle differently. By tilting the right wheels more than the left wheels, the vehicle may be steered to the right, and vice versa. Steering is obtained by virtue of the fact that the effective diameter of the tread becomes smaller as the wheel is tilted. Of course, two wheels (such as wheels 11 in FIG. 1) could be employed for steering, if desired. Steering, in FIGURE 4 for instance, could also be obtained by braking the wheels as set forth with respect to FIGURE 1 (as shown and discussed in reference to FIGURE 6 subsequently) or by using a controlled differential or a cross drive transmission.

In FIGURE 4 tires 34 are shown as having a smaller diameter than tires 32. The larger tire is effective in the upright wheel position, and the smaller tire is effective in the tilted wheel position. Two tires of equal diameter could be employed, in which case both tires would be effective in the upright wheel position, and the outer tire would be effective in the tilted wheel position. Of course on soft terrain both tires are effective. The respective tires may assume different configurations particularly favorable to the respective types of driving. It will be appreciated that by employing the construction illustrated in FIGURE 4, the advantages of the tilted wheel as well as the upright wheel are retained.

In FIGURE 5 the wheel construction is of a type more particularly illustrated in FIGURE 6. Each wheel 11c comprises a rim 36, which is curved as illustrated to support and retain a curved pneumatic tire 38. The outer surface of the tire may conform to the generally conoidal, or more specifically hemispheroidal or hemispherical wheel shape. It will be appreciated that when the outer shape of the wheels is not hemispherical, tilting the wheels will permit raising or lowering the body of the vehicle. Furthermore, the location along the wheel axis of the pivot point about which the wheel is tilted will also determine whether the vehicle body is raised or lowered when the wheels are tilted. Thus even with hemispherical wheels, the body may be raised or lowered when the wheels are tilted, depending upon the location of the pivot point on the wheel axis with respect to the geometric center about which the hemispherical wheel surface is formed. For example, if the pivot point lies within the hemisphere, the vehicle will be lowered when the wheel axes are tilted downwardly, while if the pivot point lies outside the hemisphere (i.e., closer to the vehicle body) the vehicle will be raised when the wheels are tilted. The vehicle may, therefore, be constructed to ensure the desired height of the body with the wheels tilted. As illustrated in FIGURE 5, the wheels may be tilted at will from a substantially upright position with the rotational axes horizontal, as shown, to a strongly canted position with the rotational axes tilted downwardly. In the latter position, the wheels may almost meet under the vehicle so as to protect the underside of the vehicle from obstacles on the terrain.

Referring to FIGURE 6, one embodiment of a tiltable wheel construction is illustrated in detail. In addition to the curved inner portion, rim 36 comprises a tubular central portion 40 which may be formed integrally with the curved inner portion and with a pair of circular hub contacting portions 42, 44. The tire, which has a first surface portion 38a surrounding the rim portion 40, a second surface portion 38b contiguous with the curved portion of the rim and third surface portion 38c free to engage the ground, may be retained on the rim by a plurality of projecting lugs 46, which may be secured to the rim as by a plurality of bolts 48. The hub of the wheel may be formed in two parts 50, 52, the former part being splined to an axle 54, as indicated at 56. Inner hub portion 50 may be riveted to the inner circular portion 42 of the rim as indicated at 58, and the same rivets may serve to join the hub and rim to a brake drum 60. Outer hub portion 52 may be riveted to the inner hub portion as indicated at 62 and to the outer circular portion 44 of the rim as indicated at 64.

The outer hub portion may be provided with a cap 66 which may be secured by friction or suitable threads. The outer end of axle 54 is threaded to receive cooperating nut 68, which engages a washer 70 seated in a depression at the end of hub portion 50.

Brake drum 60, which rotates with the wheel, has a cooperating, relatively stationary portion 72, which may support a plurality of hydraulically actuated brake shoes 74. The brake shoe supporting portion is fixed, as by riveting, to the outer housing portion 76 of a universal ball joint. Casing 76 is provided with a retainer ring 78, which may be held thereon by bolts 80. The retainer ring may be formed integrally with an operating lever 82, the upper end of which is pivotally connected to a piston rod 84. The piston rod is driven from a piston (not shown) reciprocatively mounted in a hydraulic cylinder 86. The latter may be pivotally mounted as indicated at 88 on a side portion of the body 10 of the vehicle.

The ball joint has an inner housing portion 90 which may be supported, as by bolts 92 on the cover plate 94 of a housing 96 secured to or forming a part of the vehicle body. Outer ball joint housing portion 76 may be pivoted on portion 90 about an axis perpendicular to the plane of the drawing by virtue of a pair of trunnions (not shown) fixed to inner housing portion 90. Axle 54 is mounted for rotation in the outer ball joint housing portion 76 as by a plurality of roller bearings 98. These bearings may be provided with a suitable seal 100. The inner end of axle 54 is arranged to pivot about a ball 102 centrally mounted in the universal joint.

Drive shaft 104, supported by suitable bearings 106 in a sleeve casing 108 is driven from a conventional differential 31 (in FIG. 5) which may be located in the lower portion of the body 10 of the vehicle. The free end of the drive shaft carries a sprocket wheel 110. Sprocket wheel 110 drives a double link chain 112, which in turn drives a driven sprocket wheel 114. The latter is supported for rotation as by roller bearings 116 on a stub shaft 118 supported by a framework 120 in housing 96. The driving elements of the ball joint comprise a first knuckle 122 fixed to sprocket wheel 114 as by bolts 124 and arranged to rotate with this sprocket wheel, and a second knuckle 123 formed integrally with axle 54. Suitable packings or seals 126 may be provided between knuckle 122 and cover plate 94. Knuckles 122, 123 interlock as illustrated and are provided with four balls 125 (two on each side of the axle axis) which move in grooves 127 milled in the complementary inner surfaces of the knuckles. Knuckle 123 may thus be tilted universally with respect to knuckle 122 about central pivot ball 102, balls 125 serving as bearings between the relatively moving surfaces. It will be appreciated that any other suitable conventional universal joint may be employed in place of the joint illustrated.

The wheel in FIGURE 6 is illustrated in its upright position with the rotational axis horizontal. A tilted position with the rotational axis pointing downwardly (and the vehicle body lowered) is indicated by the phantom lines. In order to tilt the wheel from its upright position, a person carried by vehicle actuates a conventional control device (not shown), whereby fluid from a supply (not shown) is forced into hydraulic cylinder 86 under pressure, thereby causing the piston rod 84 to move outwardly, tilting the actuating lever 82 along with the outer casing 76 of the ball joint, axle 54 and wheel 11. Power from the differential 31 associated with the engine is transmitted through drive shaft 104, sprocket wheel 110, chain 112, sprocket wheel 114, the knuckles 122, 123 of the ball joint and axle 54 to the wheel. For high speed driving on hard surfaced roads the wheel is maintained in its upright position as illustrated. In soft or uneven terrain the wheel may be tilted to the desired degree through actuation of the mechanism just described. The degree of tilt may, of course, be determined by the terrain conditions. The wheel on the other side of the body of the vehicle may be actuated and driven in the same manner. In some instances, it may be desirable to tilt the respective wheels to different angles, for example, to obtain steering as set forth above, and this may be accomplished simply by actuating the hydraulic cylinders individually. For most purposes, however, it may be sufficient to actuate the cylinders in unison. The brake mechanism described may be utilized as another means of steering the vehicle as well as a means for arresting its motion. It may also be appreciated that if the hydraulic cylinder is arranged to draw the piston rod inwardly from the position illustrated in FIG. 6, the axis of the wheel may be tilted upwardly rather than downwardly. While the type of wheel and tire configuration illustrated in FIGURE 6 is believed to be particularly favorable to the type of vehicle described and claimed in the aforesaid prior application, it will be appreciated that the tilting mechanism illustrated in FIGURE 6 may be employed with many other types of wheel and tire configurations. Two such tire configurations have been illustrated and described with reference to FIGURES 1 through 4.

While a preferred form of the invention has been shown and described, it will be apparent to those skilled in the art that this form may be modified in many ways without departing from the principles of the invention. In farm tractors, for instance, instead of varying the spacing of the usual upright wheels, a tractor having variably tiltable wheels could be employed to obtain the desired wheel spacing at ground level. The wheels could be tilted so that the spacing of the wheels at ground level is less than or greater than the spacing with the wheels upright, so as to suit the needs of the farmer. It is thus to be understood that in its broader aspects the invention contemplates the tilting of the outwardly directed wheel axes both upwardly and downwardly from the horizontal to any desired degree within predetermined limits. Those embodiments which can be reasonably construed to fall within the scope of the invention as defined in the appended claims are intended to form a part of my invention. The embodiments described and illustrated are therefore to be taken as illustrative rather than restrictive of the invention.

I claim:

1. A vehicle comprising a structure, load-carrying ground-engaging wheels disposed respectively on opposite sides of said vehicle, means mounting said wheels on said structure and maintaining the axes of rotation of the wheels tilting outwardly and downwardly thereby placing the lower inner ends of the wheels under the vehicle structure to at least partially shield the lower portion of said vehicle structure, said means including means for varying the angle of tilt of at least one of the wheels, each said wheel having a maximum thickness which approximates the radius of the wheel and also having a generally decreasing diameter, perpendicular to the axis of rotation, as the distance from the vehicle structure increases to thereby provide a large ground-contacting surface thereof as well as a stable vehicle.

2. A vehicle comprising a structure, load-carrying ground-engaging wheels disposed respectively on opposite sides of said vehicle, means mounting said wheels on said structure and maintaining the axes of rotation of the wheels tilting outwardly and downwardly thereby placing the lower inner ends of the wheels under the vehicle structure to at least partially shield the lower portion of said vehicle structure, said means including means manually controlled from inside of the vehicle to vary the angle of tilt of at least one of the wheels, each said wheel having a maximum thickness which approximates the radius of the wheel and also having a generally decreasing diameter, perpendicular to the axis of rotation, as the distance from the vehicle structure increases to thereby provide a large ground-contacting surface thereof as well as a stable vehicle.

3. A vehicle comprising a structure, load-carrying ground-engaging wheels disposed respectively on opposite sides of said vehicle, means mounting said wheels on said structure and maintaining the axes of rotation of the wheels tilting outwardly and downwardly thereby placing the lower inner ends of the wheels under the vehicle structure to at least partially shield the lower portion of said vehicle structure, and means manually controllable from within the vehicle to vary the angle of tilt of one of the wheels independently of the other wheel, each said wheel having a maximum thickness which approximates the radius of the wheel and also having a generally decreasing diameter, perpendicular to the axis of rotation as the distance from the vehicle structure increases to thereby provide a large ground-contacting surface thereof as well as a stable vehicle.

4. A vehicle comprising a vehicle structure, traction and load-carrying wheels disposed respectively on opposite sides thereof, means for supplying traction torque to each wheel and for mounting each wheel about an axis inclined outwardly and downwardly, said means including means controllable from within the vehicle to selectively vary the angle of inclination of said wheels, said first-named means also including a driving element rotatable about said axis and connected to the wheel for rotating the latter about its axis, and engine means for applying torque to said driving elements thereby to rotate the wheels, said wheels each having a rolling ground-contacting surface of generally decreasing wheel diameter as the distance from the vehicle structure increases.

5. A vehicle comprising a vehicle structure, traction and load-carrying wheels disposed respectively on opposite sides thereof, means for supplying traction torque to each wheel and for mounting each wheel about an axis inclined outwardly and downwardly, said means including means controllable from within the vehicle to vary the angle of tilt of the wheel selectively and independently of variations in the other wheel, said first-named means also including a driving element rotatable about said axis and connected to the wheel for rotating the latter about its axis, and engine means for applying torque to said driving elements thereby to rotate the wheels, said wheels each having a rolling ground-contacting surface of generally decreasing wheel diameter as the distance from the vehicle structure increases.

6. A vehicle comprising a vehicle structure, traction and load-carrying wheels disposed respectively on opposite sides thereof, means for supplying traction torque to each wheel and for mounting each wheel about an axis inclined outwardly and downwardly, the first-named means including a universal joint for each wheel which joint has a first portion fixed to the vehicle structure and a second portion tiltable with respect to the first, an axle for the wheel coupled to and tiltable with the second portion of said joints and rotatable with respect thereto, said first-named means also including a driving element rotatable about said axis and connected to the wheel for rotating the latter about its axis, and engine means for applying torque to said driving elements thereby to rotate the wheels, said wheels each having a rolling ground-contacting surface of generally decreasing wheel diameter as the distance from the vehicle structure increases.

7. A vehicle comprising a structure, load-carrying ground-engaging wheels disposed respectively on opposite sides of said vehicle, means mounting said wheels on said structure and maintaining the axes of the wheels tilting outwardly and downwardly thereby placing the lower inner ends of the wheels under the vehicle structure to at least partially shield the lower portion of said vehicle structure, said means including means to vary the angle of inclination of at least one of the wheels, each said wheel having a generally decreasing diameter as the distance from the vehicle structure increases and the outer surface of the wheel extending at least to the point on the ground vertically beneath the intersection of the plane of the inner edge of the wheel with the axis thereof.

References Cited in the file of this patent

UNITED STATES PATENTS

| | | |
|---|---|---|
| 829,605 | Ridings | Aug. 28, 1906 |
| 1,190,537 | Fry | July 11, 1916 |
| 1,624,127 | Arndt | Apr. 12, 1927 |
| 1,834,239 | Gledhill | Dec. 1, 1931 |
| 1,868,648 | Wells et al. | July 26, 1932 |
| 2,005,626 | Maranville | June 18, 1935 |
| 2,281,555 | Castiglia | May 5, 1942 |
| 2,352,593 | Allin | July 4, 1944 |
| 2,372,043 | Aghnides | Mar. 20, 1945 |
| 2,416,478 | Harbers | Feb. 25, 1947 |
| 2,448,222 | Jones | Aug. 31, 1948 |
| 2,494,324 | Wright | Jan. 10, 1950 |
| 2,624,415 | Moore | Jan. 6, 1953 |
| 2,625,232 | Lado | Jan. 13, 1953 |